United States Patent [19]

Balzer et al.

[11] 4,237,249
[45] Dec. 2, 1980

[54] PROCESS FOR THE PREPARATION OF CROSSLINKED COPOLYMERS, THE PROCESS PRODUCTS OBTAINED, AND THEIR USE IN TEXTILE PRINTING

[75] Inventors: Juliane Balzer; Friedrich Engelhardt, both of Frankfurt am Main; Joachim Ribka, Offenbach am Main-Bürgel; Wolfram Schidlo, Diedenbergen, all of Fed. Rep. of Germany

[73] Assignee: Cassella Aktiengesellschaft, Frankfurt am Main, Fed. Rep. of Germany

[21] Appl. No.: 965,608

[22] Filed: Dec. 1, 1978

[30] Foreign Application Priority Data

Dec. 5, 1977 [DE] Fed. Rep. of Germany ....... 2754058

[51] Int. Cl.³ ............................ C08F 8/28; C08F 8/12; C08F 8/44
[52] U.S. Cl. ................................. 525/369; 525/154; 525/158; 525/162; 525/332; 525/336; 525/385; 526/209; 526/210; 526/212
[58] Field of Search .................. 526/47.9, 212, 210, 526/209; 525/369, 336

[56] References Cited

U.S. PATENT DOCUMENTS

| | | | |
|---|---|---|---|
| 3,247,171 | 4/1966 | Walker et al. | 526/47.9 |
| 3,784,597 | 1/1974 | Fujimoto et al. | 526/47.9 |
| 4,146,690 | 3/1979 | Tago et al. | 526/47.9 |

FOREIGN PATENT DOCUMENTS

1042233 10/1958 Fed. Rep. of Germany .

*Primary Examiner*—William F. Hamrock
*Attorney, Agent, or Firm*—Connolly and Hutz

[57] ABSTRACT

A crosslinked copolymer useful in textile printing is prepared by
(a) polymerizing in the presence of a radical initiator in a water-miscible alkanol k mole percent acrylamide with 0 to 45 mole percent of a compound of the formula

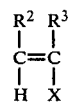

and 0.1 to 20 mole percent of a crosslinked agent wherein k is 99.9 to 50, $R^2$ and $R^3$ are hydrogen or methyl with the proviso that only one of $R^2$ and $R^3$ may be simultaneously methyl, and I is a member selected from the group consisting of cyano, alkoxy carbonyl having a total of 1 to 9 carbon atoms, alkoxy carbonyl with hydroxy substituted alkoxy moiety having 2 to 8 carbon atoms in the hydroxy substituted alkoxy; alkanoyloxy having a total of 2 to 6 carbon atoms, alkanoylamino having a total of 2 to 8 carbon atoms, cyclic alkanoylamino having a total of 4 to 8 carbon atoms, phenyl and trialkoxysilyl having 1 to 2 carbon atoms in the alkoxy;
(b) mixing the polymer from (a) with p mole percent of a hydroxide of the formula MOH wherein p is 5 to k and M is an alkali metal; and
(c) saponifying the polymer mixture from (b) at 30 to 150° C. until p mole percent of amine moieties are saponified to —COOM;
(d) removing by-product ammonia; and optionally
(e) methylolating the saponified polymer in a lower alkanol with 0 to (k-p) mole percent paraformaldehyde at a temperature of 10° C. to the boiling point of said lower alkanol.

8 Claims, No Drawings

PROCESS FOR THE PREPARATION OF CROSSLINKED COPOLYMERS, THE PROCESS PRODUCTS OBTAINED, AND THEIR USE IN TEXTILE PRINTING

The present invention relates to a process for the preparation of crosslinked copolymers whose polymer chains have the following composition:

k-p mole % groups of the formula

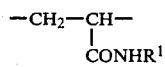

p mole % groups of the formula

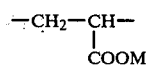

0 to 45 mole % groups of the formula

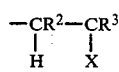

and 0.1 to 20 mole % of a crosslinking agent;

$R^1$ denotes, in the statistical mean, 0 to 100% hydrogen and 100 to 0%, in each case with reference to the proportion of k-p mole % —$CH_2OH$— groups, $R^2$ and $R^3$ denote hydrogen, or one of the radicals $R^2$ and $R^3$ denotes a methyl group, the other denotes hydrogen, X denotes cyano, alkoxycarbonyl, alkanoyloxy, possibly cyclic alkanoylamino, phenyl or trialkoxysilyl, M denotes an alkali metal cation and k stands for the range 99.9 to 50, p stands for the range 5 to k, through copolymerisation of acrylamide, subsequent partial alkaline hydrolysis and, where appropriate, methylolation, and their use as thickeners in textile printing.

It is known to prepare crosslinked copolymers through copolymerisation of acrylamide with olefinically polyunsaturated compounds in aqueous solution. The crosslinked copolymers so obtained are still swellable in water but are no longer water-soluble. From U.S. Pat. No. 3,210,310, French Patent Specification No. 1,411,944 there has been described the fixation of sandy soil through copolymerisation of aqueous monomer solutions in the soil formation which is to be fixed.

When the copolymerisation is carried out with the monomer compositions known from these printed documents and the crosslinked copolymers so obtained are isolated, pulverulent products are obtained which in water have only a weak capacity for swelling.

It is also already known that copolymers which are water-insoluble but swellable in water can be prepared in solid form through precipitation polymerisation in organic solvents, with the use of, as starting material, (a) compounds which contain at least two olefinically unsaturated polymerisable groups, as for example ethanediol diacrylate or divinyl benzene, (b) water-soluble polymerisable compounds such as acrylic acid or acrylamide and, where appropriate, (c) water-insoluble monomers such as methyl methacrylate or sytrene.

Here, however, inhomogeneous polymers are obtained which contain particles of various swelling capacity. From German Patent Specification 1 042 233, crosslinked copolymers are known which contain, polymerised into them, at least 25% by weight of a lower aliphatic $\alpha$, $\beta$-unsaturated carboxylic acid or an anhydride of a lower aliphatic unsaturated polycarboxylic acid, 0 to 75% by weight of a mono-olefinic monomer different therefrom and 0.1 to 30%, with reference to the weight of the carboxylic acid or carboxylic acid anhydrides, of a polyvinyl, polyallyl or polycrotyl ether of a polyhydric alcohol with at least 4 C atoms and at least 3 OH groups in the molecule, which ether has at least 2 vinyl, allyl or crotyl ether groups in the molecule.

A serious disadvantage of this known process consists in that it leads only to polymers with free carboxyl groups. These compounds, however, have only a restricted water-binding capacity, i.e. a relatively low swellability. In order to obtain highly swellable substances it is necessary to macerate with alkali the polymers obtained according to the known process which frequently have a tough, rubberlike nature. Here, a jelly is obtained which, through further addition of water, can be adjusted to the desired viscosity. This complicated process represents a considerable impairment of the use of these known thickeners. A further difficulty of the application of the known thickeners consists in that, in order to develop their maximum effect, they must not be converted into the salts completely but, instead, only to a specific, defined fraction. Here there results the considerable difficulty that, in the maceration, the alkali, which is present in smaller amount than the carboxyl groups, must gradually, from the outside to the inside, diffuse into a preswollen, crosslinked polymer. This requires not only a high expenditure of time but, necessarily, also leads to a non-uniform degree of neutralisation of the polymer particle, namely a degree of neutralisation which diminishes from the outside toward the inside. This has the consequence that the swellability is not optimum and the thickenings obtained with the products have a granular, non-uniform structure. The thickening effect itself of the known products is non-uniform and relatively low by reason of technical service difficulties. Besides the technical service disadvantages of the crosslinked copolymers which can be prepared according to German Patent Specification No. 1,042,233, the preparative process itself also exhibits, in terms of process technology, defects and difficulties which, particularly in the case of operation of the process on a large industrial scale, entail danger factors and could lead to trouble. For the known process can, because of the use of monomeric acrylic acid in the copolymerisation, be carried out only in relatively low-boiling hydrocarbons which, as is known, have a very low flash point and therefore are only with reluctance used as solvents in industry. Furthermore, during copolymerisation, frequently very fine-grained, almost slurry-like polymers are obtained whose filtration cannot always be smoothly contrived but which, instead, frequently clog the pores of the filters and thus upset the course of production.

It has now been found that the difficulties of the known preparative processes can be avoided and, moreover, products are obtained which can be applied without difficulties and, in the effect and the quality of the thickenings obtained, are substantially superior to the hitherto known products when crosslinked copolymers whose polymer chains have the following composition:

k-p mole % groups of the formula

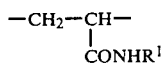

p mole % groups of the formula

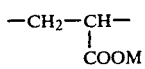

0 to 45 mole % groups of the formula

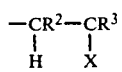

and
0.1 to 20 mole % of a crosslinking agent and $R^1$ denotes, in the statistical mean, 0 to 100% hydrogen and 100 to 0%, in each case with reference to the proportion of k-p mole % —CH$_2$OH— groups, $R^2$ and $R^3$ denote hydrogen, or one of the radicals $R^2$ and $R^3$ denotes a methyl group, the other denotes hydrogen, X denotes cyano, alkoxycarbonyl with a total of 1 to 9 C atoms alkoxy-carbonyl whose alkoxy radical contains 2-8 C atoms and is substituted by —OH, alkanoyloxy with a total of 2 to 6 C atoms, alkanoylamino with a total of 2 to 8 C atoms, which, in so far as they have at least 4 C atoms, may also be cyclic and then form a pyrrolidone ring, piperidone ring or caprolactam ring, phenyl or trialkoxysilyl with 1 to 2 C atoms in the alkoxy groups, M denotes an alkali metal cation and k stands for the range 99.9 to 50, p stands for the range 5 to k, are prepared in such a manner that, with reference to the total molar amount of all monomers, k mole% acryl amide, k having the meaning stated above, 0 to 45 % of a compound of the formula I

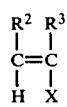 (I)

wherein $R^2$, $R^3$ and X have the meanings stated above, and 0.1 to 20 mole % of a crosslinking agent are copolymerised in the presence of a radical initiator in a water-miscible alkanol, the obtained polymer dispersion is, with the action of strong shearing forces, mixed with p mole % of an alkali metal hydroxide of the formula MOH, wherein p has the meaning stated above, and is heated to 30° to 150° C. until the saponification of p mole % amide groups to give —COOM groups, and the obtained copolymer is either isolated or, after removal of the ammonia, is methylolated in a lower alkanol with 0 to (k-p) mole % paraformaldehyde, k and p having the meanings stated above, at temperatures between 10° C. and the boiling point of the lower alkanol used.

Examples of compounds of the formula I which may be used conjointly in the copolymerisation according to the invention are: acrylonitrile, methacrylonitrile, crotonic acid nitrile, methyl, ethyl, β-hydroxyethyl, propyl, β-hydroxypropyl, isopropyl, (n)-butyl, isobutyl, sec.butyl, tert.butyl, pentyl, hexyl, 2-ethyl-hexyl acrylate; acrylic acid; methyl, ethyl, β-hydroxyethyl, propyl, β- hydroxypropyl, isopropyl, (n)butyl, isobutyl, sec.butyl, tert.butyl, pentyl, hexyl, 2-ethyl-hexyl methacrylate; methyl, ethyl, propyl, isopropyl, (n)butyl, 2-ethyl-hexyl crotonate; vinyl acetate, vinyl propionate, vinyl butyrate, vinyl caproate, 3-allyl(Δ1,2)-acetate, -propionate, -butyrate; N-vinyl-acetamide, -propionamide, -butyramide; N-vinylpyrrolidone, -piperidone, -caprolactam; styrene, trimethoxysilylethylene, triethoxysilylethylene, 1- or 3-trimethoxysilylpropylene(Δ1,2),1- or3-triethoxysilylpropylene(Δ1,2).

In so far as compounds of the formula I are conjointly used in the copolymerisation, those are preferred in which $R^2$ denotes hydrogen, $R^3$ denotes hydrogen or methyl, and X denotes cyano, alkoxycarbonyl with 1-8 C atoms whose alkoxy radical may also be substituted by—OH, acetoxy, N-pyrrolidonyl, phenyl or triethoxysilyl.

In view of the technical service properties in the case of the use as thickener in pigment printing as well as taking the price of the products into account, it is preferred to use, at the most, 20% but, in particular, none at all of the compounds of the formula I in the copolymerisation.

A further preferred group of crosslinked copolymers which can be prepared according to the invention is characterised in that p has a value from 30 to 70, i.e. that the polymers, with reference to the total molar number of the copolymerised monomers, contain 30 to 70 mole % —COOM groups. Such preferred copolymers according to the invention are distinguished by optimum thickening effect with, simultaneously, minimum electrolyte sensitivity.

As crosslinking agent, in the copolymerisation according to the invention olefinically polyunsaturated compounds are used, such as e.g. divinyl benzene, tetraallyloxethane, dialkyl ethers, allyl ethers of polyfunctional alcohol components, such as e.g. di- and triallylglycerol ethers as well as allyl ethers which derive from alcohols of the sugar series, say erythritol, pentaerythritol, arabitol, mannitol, sorbitol or glucose. Particularly suitable proved to be polyglycerolpolyallyl and polymethallyl ethers of the general formula II

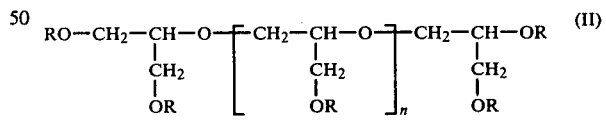 (II)

wherein n stands for a number from 0 to 30, preferably 1 to 10, and

R denotes 70 to 5% hydrogen and 95 to 30% groups of the formula —CH$_2$—CH=CH$_2$ or —CH$_2$—C(CH$_3$)=CH$_2$.

Such polyglycerolpolyallyl and polymethallyl ethers are prepared in known-per-se manner through reaction of polyglycerols-prepared e.g. through polycondensation of glycide-with allyl chloride or methallylchloride.

The copolymerisation of the acrylamide of the compound of the formula I and the crosslinking agent is effected in a water-soluble alkanol with 1 to 4 C atoms, such as methanol, ethanol, propanol, isopropanol, preferably in tert.butanol, as solvent.

The water content of the lower alkanols used as solvent should not exceed 10% by weight since otherwise a lump formation may occur during the polymerisation. Preferably, the work is carried out with a water content of 0–5%.

The amount of the solvent which is to be used is governed to a certain extent by the nature of the comonomers used.

As a rule, 200 to 1000 g of the solvent per 100 g of total monomers are used.

As usual, the polymerisation is carried out in a protective gas atmosphere, preferably under nitrogen. The polymerisation temperature lies between 20° to 120° C., preferably 40° to 80° C.

For the triggering of the polymerisation, the usual polymerisation initiators may be used, e.g. organic peroxides, such as benzoyl peroxide, tert.butyl hydroperoxide, methyl ethyl ketone peroxide, cumene hydroperoxide. Azo compounds, too, such as azo-di-isobutyronitrile, may be used with success. Advantageous proved to be, above all, redox systems which contain, as reducing components, aliphatic and aromatic sulphinic acids, such as benzenesulphinic acid and toluenesulphinic acid or derivatives of these acids, such as e.g. Mannich adducts of sulphinic acids, aldehydes and amino compounds such as are described in German Patent Specification No. 1 301 566. As a rule, 0.05 to 2 g of the polymerisation initiator are used per 100 g of total monomers.

In the case of the carrying out of the copolymerisation in the manner described, there are obtained polymer pastes which lend themselves well to being stirred and which are readily suitable for the subsequent reaction with alkali metal hydroxides. It is, of course, also possible intermediately to isolate the obtained copolymer, for example through suction filtration and washing with the solvent used.

The polymer paste obtained in the polymerisation, which paste has as a rule a slightly granular nature, is first of all subjected to strong shearing forces in a suitable apparatus, e.g. through stirring with a highspeed stirrer (Ultra-Turrax) or grinding in a PUC mill until a completely uniform flow behaviour of the suspension is achieved; the desired amount of the alkali metal hydroxide is then added with sustained further vigorous intermixing and, depending on the mixing or grinding unit used, a further addition of 0 to 200 ml of the solvent used, with reference to 100 g of copolymer, may become necessary.

The mixture, obtained in the manner described, of the polymer dispersion with the metal hydroxide is subsequently heated to 30° to 150° C., with stirring, until the desired degree of saponification is obtained.

In order to prepare a copolymer with p mole % —COOM groups, for saponification p mole % of the alkali metal hydroxide are also used. The preferred saponification temperature lies at 50° to 100° C.

It is particularly advantageous to carry out the saponification at the boiling temperature of the reaction mixture at the reflux condenser.

The alkali metal hydroxide is expediently added in finely ground form to the copolymer dispersion.

As alkali metal hydroxides, sodium hydroxide and potassium hydroxide are preferred.

With these reaction conditions, the saponification lasts for about 1 to 6 hours.

The process according to the invention may, in principle, also be carried out without the action of high shearing forces on the copolymer dispersion before and during the addition of alkali. Working under the action of shearing forces, however, is particularly preferred because the products prepared according to this embodiment not only yield substantially more homogeneous thickenings but are also about ten times more effective than products which have been prepared without use of high shearing forces.

This effect of high shearing forces in the preparation according to the invention of the copolymers is exceedingly surprising because it is known that the action of high shearing forces on polyacrylamides leads to a reduction of the average molecular weight by leaps and bounds and thus to a drastic reduction of the viscosity (comp. e.g. Bestul, Journal of Chemical Physics, Volume 24, pages 1196 to 1201, Journal of Applied Physics, Volume 25, pages 1069 to 1074).

The unforeseeable and surprising fact that working under the action of high shearing forces in the case of the process according to the invention leads to products with drastically improved properties determines the particular value of this preferred process measure.

If crosslinked copolymers according to the invention are to be prepared in which the $R^1$ groups present denote 100% hydrogen, the copolymer, after completion of the saponification reaction, is isolated, either through evaporation of the solvent used or through suction filtration of the dispersion and afterwashing of the polymer with the solvent used or a readily volatile lower alkanol; after isolation, drying is effected, preferably in a vacuum, at 40° to 80° C. In this manner, a finely pulverulent copolymer of the composition stated above is obtained which can be used directly as thickener. For this purpose, it is merely necessary to stir the desired amount of the powder into the required amount of water. Completely homogeneous, transparent, highly viscous solutions or jellies whch are to a high extent dimensionally stable are obtained.

In order to prepare crosslinked copolymers according to the invention in which R denotes, in the statistical mean, to a certain percentage the methylol group, i.e. copolymers whose amide groups are wholly or partially methylolated, the copolymers obtained after the saponification are reacted, in a water-soluble alkanol of 1–4 C atoms, with the amount of paraformaldehyde corresponding to the desired degree of methylolation. For this reaction, the copolymers which are prepared according to the invention and isolated after saponification may be used. For this purpose, they are suspended in the 3- to 10-fold amount by weight of the alkanol used as solvent; the calculated amount of paraformaldehyde is added, and the mixture is methylolated at a temperature between 10° C. and the boiling point of the alkanol used as solvent.

If copolymers according to the invention in which the $R^1$ groups present are 100% —$CH_2OH$ are to be prepared, i.e. all available carbonamide groups are to be methylolated, an excess of paraformaldehyde of up to 20 % may also be used.

The duration of reaction is here governed by the reaction temperature and it is therefore preferred that, for the achieving of economic reaction times, the methylolation be carried out at temperatures between 40° C. and the boiling point of the solvent, in particular at 50°–60° C.

In order to prepare methylolated copolymers according to the invention, it is, however, by no means necessary to isolate the copolymers after saponification; rather, the polymer dispersions obtained in the saponification may directly be further processed if steps are taken to see to it that ammonia formed during the saponification is removed from the reaction mixture. This may in the simplest case be effected by distilling off a part of the alkanol used as solvent. Too strong a thickening of the polymer dispersion may be avoided through addition of fresh solvent; also, the explusion of the ammonia may be completed through another addition, or repeated additions, of fresh solvent, and distillation.

A likewise very expedient embodiment of the methylolation consists in that the reaction mixture, after addition of the paraformaldehyde, is allowed to react over night at room temperature.

According to the process of the present invention there are obtained crosslinked copolymers whose polymer chains have the following composition:

k-p mole % groups of the formula

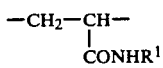

p mole % groups of the formula

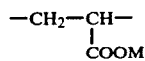

0 to 45 mole % groups of the formula

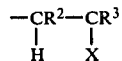

and 0.1 to 20 mole % of a crosslinking agent, wherein $R^1$ denotes, in the statistical means, from 0 to 20% hydrogen and from 100 to 80% in each case with reference to the proportion of k-p mole %, —CH$_2$OH-groups, $R^2$ and $R^3$ denote hydrogen or one of the radicals $R^2$ and $R^3$ denotes a methyl group, the other denotes hydrogen, X denotes cyano, alkoxycarbonyl with a total of 1 to 9 C atoms, alkoxy-carbonyl whose alkoxy radical contains 2-8 C-atoms and is substituted by -OH, alkanoyloxy with a total of 2 to 6 C atoms, alkanoylamino with a total of 2 to 8 C atoms, which, in so far as they have at least 4 C atoms, may also be cyclic and then form a pyrrolidone ring, piperidone or caprolactam ring, phenyl or trialkoxysilyl with 1 to 2 C atoms in the alkoxy groups, M denotes an alkalimetal cation and k stands for the range 99.9 to 50 as well as p stands for the range 5 to k.

Preferred in this case are those crosslinked copolymers whose polymer chains have 0 to 20 mole %, in particular 0 mole % groups of the formula

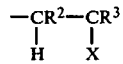

A further characteristic of preferred polymers of the present invention is that in the components of the formula

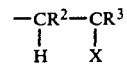

$R^2$ denotes hydrogen, $R^3$ denotes a methyl group and X cyano, alkoxycarbonyl with 1 to 8 carbon atoms whose alkoxy radical may be substituted by -OH, acetoxy, N-pyrrolidonyl, phenyl or triethoxysilyl and/or that p stands for the range 30 to 70. An other feature of preferred polymers of the present invention is that the polymer chains have 1 to 2 mole % crosslinking members, and that, particularly advantageously those of the formula

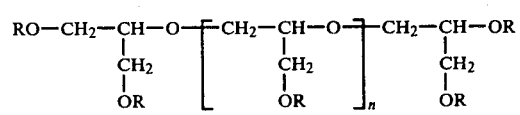

wherein n stands for a number of 0 to 30 and R denotes 70 to 5% hydrogen and 95 to 30% groups of the formula

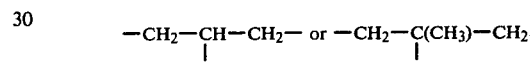

in which case crosslinkage is effected via the groups

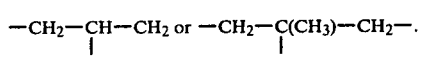

Copolymers crosslinked according to the invention in which R denotes, in the statistical mean, in part methylol groups, i.e. whose amide groups are methylolated wholly or in part, preferably to 80 to 100%, show quite particular advantages when used as thickeners in textile pigment printing. In this case, prints of quite particularly high wet-fastness and fastness to dry rubbing, and of outstanding brilliancy, are obtained. The other relevant properties of pigment prints, such as e.g. outline sharpness, fastness to wet cleaning and to dry cleaning, light-fastness, perspiration-fastness, and handle, are very good, so that the combination of all essential properties of the pigment prints produced with the use of thickeners according to the invention is substantially superior to the pigment prints produced with the use of known thickeners.

For the application in textile pigment printing of the polymers which can be prepared according to the invention there is a further advantage in that it is not necessary to isolate the copolymer from the reaction mixture; instead, it is possible to carry out the formulation of the pigment printing paste directly with use of the crude polymer dispersion obtained during preparation and only after then to distil off the alcohol used as solvent.

In the Tables 1 and 2, the proportions which the polymers contain of the groups $$-CH_2-CH-$$
$$\phantom{-CH_2-}|$$
$$\phantom{-CH_2-}CONHR^1$$

with $R^1=$ hydrogen and $R^1=-CH_2OH$ are in each case referred to the total polymer molecule. If from these statements (Column "$R^1=H$" and "$R^1=CH_2OH$") the statistical component $A_H$ of the radicals $R^1$ denoting hydrogen, and $A_F$ of the radicals $R^1$ denoting $-CH_2OH$, with reference to the proportion of k-p mole %, are to be calculated, the following relationships are valid:

$$A_H = \frac{(\text{statement column "}R^1 = H\text{"}) \cdot 100}{(\text{statement column "}R^1 = H\text{"}) + (\text{statement column "}R^1 = -CH_2OH\text{"})}$$

$$A_F = \frac{(\text{statement column "}R^1 = -CH_2OH\text{"}) \cdot 100}{(\text{statement column "}R^1 = H\text{"}) + (\text{statement column "}R^1 = -CH_2OH\text{"})}$$

For the crosslinking agents used, the following abbreviations have been used in Tables 1 and 2:
A = polyglycideallyl ether
B = polyglycidemethallyl ether
C = polyglucosemethallyl ether
D = tetraallyloxethane
E = Trisacryloylperhydro-s-triazine
F = butanedioldimethacrylate

EXAMPLE 1

In a reaction vessel equipped with stirrer, reflux condenser, thermometer, gas introduction tube, dropping funnel and electrically heatable water bath there are placed 440 ml of butanol tert. and 16 ml of de-ionised water, and 71 g of acrylamide are dissolved therein, with stirring. To this solution is now added 0.7 g of a polyallyl ether which has been prepared through reaction of a polyglycerol with a molecular weight of 1270 and an OH number of 680 with allyl chloride in aqueous alkaline medium.

With introduction of a weak nitrogen stream the monomer solution is stirred and the temperature is brought to 50° C. with the aid of the electric water bath. At this temperature a solution of 1.0 g of azodiisobutyronitrile in 70 ml of tert. butanol is now added dropwise through a dropping funnel in the course of 15 minutes. About 5 minutes after completion of addition of catalyst, the polymerisation reaction sets in. The polymer precipitates as white pasty mass while the temperature rises to 79° C. in the course of 30 minutes. After completion of polymerisation, i.e. when the reaction temperature falls, heating at 90° C. bath temperature is continued for a further 2 hours, with stirring.

After cooling of the reaction mixture to 30°–40° C., the reaction flask is equipped with a homogenishing device or the polymer dispersion is recirculated via a homogenishing device.

There are now added, with the action of strong shearing forces, 20 g of powdered NaOH and 100 to 200 ml of tert. butanol; a homogeneous white dispersion of good stirrability is formed which is now heated under reflux for 4 hours. Ammonia splits off.

In order to isolate the copolymer, the homogeneous white polymer dispersion obtained is either filtered off with suction and the polymer is subsequently dried in a vacuum or the tert. butanol used as reaction medium is distilled off in a vacuum, with stirring.

In both cases, the polymer is obtained, with $p \approx 50$ mole % and $k \approx 50$ mole %, as loose white powder. The yield is 91 g ($\sim 100\%$ of theory).

These polymers show in water an exceptionally high swelling capacity and may therefore be used as thickeners.

An 0.2% strength aqueous preparation of a polymer so prepared has at 25° C. a viscosity of 3200 cp.

When, in an analogous polymer mixture, there are used as catalyst system
0.7 g of dibutylamine hydrochloride
0.1 g of the compound

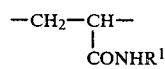

0.2 g of $(NH_4)_7S_2O_8$
there is obtained, in equally good yields, a polymer which, 2% strength in water at 25° C., shows a viscosity value of 3300 cp.

Analogously to Example 1, the valuable copolymers of the composition stated in Table 1 may also be prepared.

TABLE 1

| No. | $-CH_2-CH-$ $\|$ $CONHR^1$ $R^1=H$ [Mole %] | $R^1=-CH_2OH$ [Mole %] | $-CH_2-CH-$ $\|$ $COOM$ [Mole %] | $R^2$ | $R^3$ | $-C-C-$ $\|$ $\|$ $H$ $X$ — X | Mole % | Crosslinking agent, mole % | Yield [% of theory] | Viscosity [cp] | Ball | Content of the measured solution |
|---|---|---|---|---|---|---|---|---|---|---|---|---|
| 1 | 86.95 | — | 6.05 | — | — | — | — | F 7 | 100 | 27 | 3 | 0.2 |
| 2 | 76.30 | — | 11.7 | — | — | — | — | E 10 | 100 | 16 | 3 | 0.1 |
| 3 | 40.85 | — | 54.15 | — | — | — | — | C 5 | 100 | 64 | 3 | 0.1 |
| 4 | 7.50 | — | 89.99 | — | — | — | — | C 2.5 | 100 | '240 | 3 | 0.2 |
| 5 | — | — | 98 | — | — | — | — | C 2 | 100 | 580 | 3 | 0.2 |
| 6 | 32.77 | — | 54.15 | H | H | $-CO_2CH_3$ | 3.07 | D 5 | 100 | 70 | 3 | 0.1 |
| 7 | 24.00 | — | 58.01 | H | H | $-CO_2CH_3$ | 15.80 | E 7 | 100 | 66 | 3 | 0.1 |
| 8 | 33.64 | — | 55.58 | H | H | $-CO_2C_2H_5$ | 8.28 | D 2.5 | 100 | 340 | 3 | 0.1 |
| 9 | 25.02 | — | 55.29 | H | H | $-CO_2C_2H_6$ | 16.68 | D 3 | 93 | 150 | 3 | 0.1 |
| 10 | 23.81 | — | 55.85 | H | H | $-CO_2O_4H_9$ | 8.33 | D 2 | 96 | 990 | 3 | 0.1 |
| 11 | 24.51 | — | 48.45 | H | H | $-CO_2C_4H_9$ | 16.34 | F 5 | 91 | 1.10 | 3 | 0.1 |
| 12 | 33.98 | — | 56.14 | H | H | $\phantom{-CO_2CH_2CH}C_2H_5$ $\phantom{-CO_2CH_2CH(CH_2)_3CH_3}\|$ $-CO_2CH_2CH(CH_2)_3CH_3$ | 8.37 | E 1.5 | 97 | 2000 | 3 | 0.1 |

TABLE 1-continued

| | $R^1 =$ H [Mole %] | $R^1 =$ $-CH_2OH$ [Mole %] | $-CH_2-CH-$ $\|$ COOM [Mole %] | | | | | | | | |
|---|---|---|---|---|---|---|---|---|---|---|---|
| No. | | | | $R^2$ | $R^3$ | X | Mole % | Cross-linking agent, mole % | Yield [% of theory] | Viscosity [cp] | Ball | Content of the measured solution |
| 13 | 25.02 | — | 65.29 | H | H | $-CO_2CH_2CH(C_2H_5)(CH_2)_3CH_3$ | | | | | | |
| 14 | 31.05 | — | 51.30 | H | H | $-CN$ | 7.65 | D 10 | 100 | 16 | 3 | 0.2 |
| 15 | 23.22 | — | 51.30 | H | H | $-CN$ | 15.48 | E 10 | 100 | 21 | 3 | 0.2 |
| 16 | 33.47 | — | 55.29 | H | $CH_3$ | $-CO_2-C_2H_4OH$ | 7.90 | F 3 | 98 | 200 | 3 | 0.1 |
| 17 | 25.54 | — | 56.43 | H | $CH_3$ | $-CO_2-C_2H_4OH$ | 17.02 | C 1 | 94 | 967 | 3 | 0.2 |
| 18 | 16.77 | — | 55.57 | H | H | $-CO_2CH_2CH(C_2H_5)(CH_2)_3CH_3$ | 25.16 | F 2.6 | 100 | 248 | 3 | 0.2 |
| 19 | 3.16 | — | 54.72 | H | H | $-CO_2CH_2CH(C_2H_5)(CH_2)_3CH_3$ | 33.12 | B 4 | 94 | 50 | 3 | 0.2 |
| 20 | — | — | 45.60 | H | H | $-CO_2CH_2CH(C_2H_5)(CH_2)_3CH_3$ | 34.40 | F 20 | 87 | 9 | 2 | 0.2 |
| 21 | 27.60 | — | 45.60 | H | H | $-O-COCH_3$ | 6.80 | E 20 | 100 | 5 | 2 | 0.2 |
| 22 | 34.15 | — | 56.43 | H | H | $-C_6H_5$ | 8.43 | B 1 | 100 | 6800 | 5 | 0.2 |
| 23 | 23.22 | — | 51.30 | H | H | $-C_6H_5$ | 15.48 | F 10 | 100 | 9 | 3 | 0.2 |
| 24 | 34.15 | — | 56.43 | H | $CH_3$ | $-CO_2CH_3$ | 8.41 | B 1 | 100 | 5400 | 5 | 0.2 |
| 25 | 25.02 | — | 55.29 | H | $CH_3$ | $-CO_2CH_3$ | 16.88 | E 3 | 100 | 867 | 4 | 0.2 |
| 26 | 37.82 | — | 55.86 | H | H | $-Si(C_2H_5O)_3$ | 4.31 | A 2 | 100 | 977 | 4 | 0.2 |
| 27 | 33.46 | — | 55.29 | H | H | $-Si(C_2H_5O)_3$ | 8.24 | C 3 | 100 | 78 | 4 | 0.2 |
| 28 | 29.29 | — | 55.29 | H | H | $-Si(C_2H_5O)_3$ | 12.41 | B 3 | 100 | 163 | 4 | 0.2 |
| 29 | 24.25 | — | 53.58 | H | H | $-Si(C_2H_5O)_3$ | 16.17 | F 6 | 97 | 24 | 3 | 0.2 |
| 30 | 25.54 | — | 56.43 | H | H | $-N(CH_2-CH_2)(CO-CH_2)$ (pyrrolidone) | 17.02 | A 1 | 100 | 8293 | 5 | 0.2 |
| 31 | 60.20 | — | 26.14 | H | H | $-COOH$ | 11.5 | B 1 | 100 | 601 | 4 | 0.2 |

EXAMPLE 2

Example 1 is repeated, with the difference that the copolymer is not isolated after the four-hour reflux boiling. Instead, 200 ml of tert. butanol are distilled out of the reaction mixture in a vacuum at 60° C., with stirring. 20 g of paraformaldehyde are then added with further stirring, and stirring is continued for a further 2 hours at 50° C. Subsequently, the practically 100% methylolated copolymer obtained is worked up as described in Example 1.

The yield is 97 g (~90% of theory).

An 0.2% strength aqueous preparation of the copolymer obtained has, at 25° C., a viscosity of 3000 cp.

The product is outstandingly suitable as thickener, in particular for pigment printing pastes. The textile prints produced with these pastes are exceptionally sharp and exhibit an outstanding fastness to rubbing.

EXAMPLE 3

50 g of the pulverulent copolymer of the invention obtained according to Example 1 are suspended, with stirring, in 120 ml of tert. butanol. 9 g of paraformaldehyde are then added to the suspension and the mixture is stirred for 2 hours at 50° C.

The polymer obtained, with p≈50 mole % and a methylolation degree of about 85%, is worked up as described in Example 1.

Yield 58 g (~98% of theory)

Viscosity of the 0.2% strength aqueous preparation at 25° C: 3000 cp.

Analogously to Examples 2 or 3, the valuable copolymers of the composition stated in Table 2 may also be prepared.

TABLE 2

| | $R^1 =$ H [Mole %] | $R^1 =$ $-CH_2OH$ [Mole %] | $-CH_2-CH-$ $\|$ COOM [Mole %] | | | | | | | | |
|---|---|---|---|---|---|---|---|---|---|---|---|
| No. | | | | $R^2$ | $R^3$ | X | Mole % | Cross-linking agent, mole % | Yield [% of theory] | Viscosity [cp] | Ball | Content of the measured solution |
| 1 | — | 50.50 | 46.99 | — | — | — | — | A 2.5 | 99 | 260 | 4 | 0.2 |
| 2 | 10.37 | 37.73 | 48.88 | — | — | — | — | B 3 | 98 | 250 | 4 | 0.2 |
| 3 | 19.50 | 27.72 | 51.77 | — | — | — | — | A 1 | 100 | 31000 | 6 | 0.2 |
| 4 | 37.62 | 5.94 | 55.44 | — | — | — | — | A 1 | 100 | 23000 | 6 | 0.2 |
| 5 | 40.09 | 2.97 | 55.93 | — | — | — | — | A 1 | 100 | 25000 | 6 | 0.2 |
| 6 | 23.75 | 11.21 | 52.25 | H | H | $-CO_2CH_3$ | 7.79 | D 5 | 100 | 79 | 3 | 0.1 |
| 7 | 24.37 | 11.50 | 53.62 | H | H | $-CO_2C_2H_5$ | 7.99 | D 2.5 | 100 | 178 | 3 | 0.1 |
| 8 | 15.68 | 22.54 | 51.94 | H | H | $-CO_2C_4H_9$ | 7.84 | D 2 | 96 | 537 | 3 | 0.1 |
| 9 | 15.84 | 22.77 | 52.47 | H | $CH_3$ | $-CO_2CH_3$ | 7.92 | B 1 | 100 | 5300 | 5 | 0.2 |

TABLE 2-continued

| No. | $-CH_2-CH-$ $\|$ $CONHR^1$ $R^1 = H$ [Mole %] | $R^1 = -CH_2OH$ [Mole %] | $-CH_2-CH-$ $\|$ $COOM$ [Mole %] | $R^2$ | $R^3$ | X | Mole % | Cross-linking agent, mole % | Yield [% of theory] | Viscosity [cp] | Ball | Content of the measured solution |
|---|---|---|---|---|---|---|---|---|---|---|---|---|
| 10 | 15.52 | 22.31 | 51.41 | H | CH$_3$ | $-CO_2C_2H_4OH$ | 7.76 | F 3 | 98 | 199 | 3 | 0.1 |
| 11 | 14.4 | 20.7 | 47.7 | H | H | $-CN$ | 7.2 | D 10 | 100 | 17 | 3 | 0.1 |
| 12 | 7.2 | 20.7 | 47.7 | H | H | $-CN$ | 14.4 | E 10 | 100 | 107 | 3 | 0.2 |
| 13 | 16.10 | 11.44 | 53.35 | H | H | $\begin{array}{c} C_2H_5 \\ \| \\ -CO_2CH_2CH(CH_2)_3CH_3 \end{array}$ | 16.10 | A 3 | 91 | 340 | 3 | 0.1 |
| 14 | — | 86.95 | 6.04 | H | — | — | — | F 7 | 100 | 27 | 3 | 0.2 |
| 15 | — | 78.3 | 11.70 | H | — | — | — | E 10 | 100 | 16 | 3 | 0.1 |
| 16 | — | 40.85 | 54.15 | H | — | — | — | C 5 | 100 | 64 | 3 | 0.1 |
| 17 | — | 7.50 | 39.99 | H | — | — | — | C 2.5 | 100 | 240 | 3 | 0.2 |
| 18 | — | — | 98 | H | — | — | — | C 2 | 100 | 580 | 3 | 0 2 |
| 19 | — | 32.77 | 54.15 | H | H | $-CO_2CH_3$ | 8.07 | D 5 | 100 | 70 | 3 | 0.1 |
| 20 | — | 23.99 | 53.01 | H | H | $-CO_2CH_3$ | 15.99 | E 7 | 100 | 66 | 3 | 0.1 |
| 21 | — | 33.63 | 55.57 | H | H | $-CO_2C_2H_5$ | 8.28 | D 2.5 | 100 | 340 | 3 | 0.1 |
| 22 | — | 25.02 | 55.29 | H | H | $-CO_2C_2H_5$ | 16.68 | D 3 | 93 | 150 | 3 | 0.1 |
| 23 | — | 33.81 | 49.98 | H | H | $-CO_2C_4H_9$ | 8.33 | D 2 | 96 | 990 | 3 | 0.1 |
| 24 | — | 24.51 | 54.15 | H | H | $-CO_2C_4H_9$ | 16.34 | F 5 | 91 | 140 | 3 | 0.1 |
| 25 | — | 33.98 | 56.14 | H | H | $\begin{array}{c} C_2H_5 \\ \| \\ -CO_2CH_2CH(CH_2)_3CH_3 \end{array}$ | 8.37 | B 1.5 | 97 | 2000 | 3 | 0.1 |
| 26 | — | 25.02 | 55.29 | H | H | $\begin{array}{c} C_2H_5 \\ \| \\ -CO_2CH_2CH(CH_2)_3CH_3 \end{array}$ | 16.63 | A 3 | 91 | 420 | 3 | 0.1 |
| 27 | — | 31.05 | 51.30 | H | H | $-CN$ | 7.65 | D 10 | 100 | 16 | 3 | 0.1 |
| 28 | — | 23.22 | 51.30 | H | H | $-CN$ | 15.48 | E 10 | 100 | 81 | 3 | 0.2 |
| 29 | — | 33.46 | 55.29 | H | CH$_3$ | $-CO_2C_2H_4OH$ | 8.24 | F 3 | 98 | 200 | 3 | 0.1 |
| 30 | — | 25.54 | 56.43 | H | CH$_3$ | $-CO_2C_2H_4OH$ | 17.02 | C 1 | 94 | 967 | 3 | 0.2 |
| 31 | — | 16.77 | 55.60 | H | H | $\begin{array}{c} C_2H_5 \\ \| \\ -CO_2CH_2CH(CH_2)_3CH_3 \end{array}$ | 25.15 | F 2,5 | 100 | 248 | 3 | 0.2 |
| 32 | — | 8.16 | 54.72 | H | H | $\begin{array}{c} C_2H_5 \\ \| \\ -CO_2CH_2CH(CH_2)_3CH_3 \end{array}$ | 34.15 | B 4 | 94 | 50 | 3 | 0.2 |
| 33 | — | — | 45.60 | H | H | $\begin{array}{c} C_2H_5 \\ \| \\ -CO_2CH_2CH(CH_2)_3CH_3 \end{array}$ | 34.40 | F 20 | 37 | 9 | 2 | 0.2 |
| 34 | — | 27.60 | 45.60 | H | H | $-O-COCH_3$ | 6.80 | E 20 | 100 | 5 | 2 | 0.2 |
| 35 | — | 34.15 | 54.45 | H | H | $-C_6H_5$ | 8.41 | B 1 | 100 | 6800 | 5 | 0.2 |
| 36 | — | 23.22 | 51.30 | H | H | $-C_6H_5$ | 15.48 | F 10 | 100 | 9 | 3 | 0.2 |
| 37 | — | 34.46 | 56.94 | H | CH$_3$ | $-CO_2CH_3$ | 8.49 | A 0.1 | 100 | 5400 | 5 | 0.2 |
| 38 | — | 25.02 | 55.29 | H | CH$_3$ | $-CO_2CH_3$ | 16.68 | E 3 | 100 | 867 | 4 | 0.2 |
| 39 | — | 37.82 | 55.86 | H | H | $-Si(C_2H_5O)_3$ | 4.26 | A 2 | 100 | 977 | 4 | 0.2 |
| 40 | — | 33.46 | 55.29 | H | H | $-Si(C_2H_5O)_3$ | 8.24 | C 3 | 100 | 78 | 4 | 0.2 |
| 41 | — | 29.29 | 55.29 | H | H | $-Si(C_2H_5O)_3$ | 12.41 | B 3 | 100 | 163 | 4 | 0.2 |
| 42 | — | 24.25 | 53.58 | H | H | $-Si(C_2H_5O)_3$ | 16.16 | F 6 | 97 | 24 | 3 | 0.2 |
| 43 | — | 25.54 | 56.43 | H | H | $\begin{array}{c} CH_2-CH_2 \\ / \quad \| \\ -N \\ \backslash \quad \| \\ CO-CH_2 \end{array}$ | 17.02 | A 1 | 100 | 8293 | 5 | 0.2 |

EXAMPLE 4

A printing paste to be prepared as follows is applied in the usual manner to a cotton fabric in flat film printing.

45 parts by weight of the 20% strength dispersion (prepared through dispersion of 20 parts by weight of polymer obtained according to preparative Example No. 1 in 47 parts by weight of Esso Varsol and 32.2 parts by weight of Shell White Spirit K 21 with addition of 0.4 part by weight of an addition product of 9 moles of ethylene oxide to 1 mole of nonylphenol and 0.4 part by weight of a propylene oxide—ethylene oxide block copolymer of the propylene oxide—ethylene oxide molar ratio 90:10) are stirred, in a high-speed stirrer, into 785 parts by weight of water. Subsequently, there are added successively 120 parts by weight of a commercial, about 40% strength copolymer dispersion based on polyacrylate, 15 parts by weight of a mixed resin based on melamine-urea-formaldehyde, 25 parts by weight of the 37% strength aqueous dispersion of the pigment with C.I. No. 12 485 and 10 parts by weight of the 33.3% strength aqueous solution of an inorganic compound which splits off acid.

The red pigment print, after drying and 5 minutes' fixation at 150° C. on a hot air device, is of good fastness to rubbing and to scrubbing as well as being stable to solvents and is distinguished particularly by a soft handle.

EXAMPLE 5

A printing paste to be prepared as follows is applied in the usual manner to a cotton fabric in roller printing.

40 parts by weight of the 16% strength dispersion (prepared through dispersion of 16 parts by weight of the polymer obtained according to Example 2 in a mixture consisting of
  50 parts Esso Varsol 2,
  33 parts White Spirit K 21 (Shell),
  1 part sorbitan mono-oleate and
  1 part of an adduct of 9 moles of ethylene oxide to 1 mole of nonylphenol) are stirred, in a high-speed stirrer, into
  735 parts by weight of water. Subsequently, there are added, successively,
  150 parts by weight of a commercial, about 40% strength copolymer dispersion based on polyacrylate,
  15 parts by weight of a resin based on urea-formaldehyde,
  50 parts by weight of a 32% strength aqueous dispersion of the pigment with C.I. No. 74 160 and
  10 parts by weight of the 33% strength aqueous solution of an inorganic compound which splits off acid.

The blue pigment print has, after drying and 2 minutes' fixation at 170° C. on a hot-air fixation apparatus, a good resistance to rubbing, washing and solvents and is distinguished in particular by outstanding levelness a better class than in the case of prints with conventional printing pastes.

EXAMPLE 6

A printing paste to be prepared as follows is applied in the usual manner to a polyamide 6.6 fabric in roller printing.

40 parts by weight of the 16% strength suspension (prepared through dispersion of 16 parts by weight of the polymer obtained according to Example 3 in a mixture consisting of
  50 parts White Spirit K 21 (Shell),
  33 parts Esso Primol,
  1 part sorbitan mono-oleate and
  1 part of an adduct of 12 moles of ethylene oxide to 1 mole of nonylphenol)
are stirred, on a high-speed stirrer, into
  745 parts by weight of water. Subsequently, there are applied, successively,
  60 parts by weight of an about 40% strength commercial copolymer dispersion based on polyacrylate,
  60 parts by weight of an appropriate copolymer dispersion based on butadiene-acrylonitrile,
  20 parts by weight of a resin based on urea-formaldehyde,
  25 parts by weight of a 30% strength aqueous dispersion of the pigment with the C.I. No. 71 105 and
  10 parts by weight of a 33.3% strength aqueous solution of an inorganic compound which splits off acid.

The orange-coloured pigment print possesses, after drying and 5 minutes' fixation of 180° C. on a high-temperature steaming unit, a soft handle with good fastness to rubbing, scrubbing and solvents as well as high brilliancy and levelness.

EXAMPLE 8

A printing paste to be prepared as follows is applied in the usual manner to a polyester-cotton mixed fabric in flat film printing.

25 parts by weight of the 16% strength dispersion (prepared through dispersion of 16 parts by weight of the polymer obtained according to Example 3 in a mixture consisting of
  50 parts White Spirit K 21 (Shell),
  33 parts Esso Primol,
  1 part sorbitan mono-oleate and
  1 part of an adduct of 12 moles of ethylene oxide to 1 mole of nonylphenol)
are stirred, on a high-speed stirrer, into
  455 parts by weight of water. Subsequently, there are added, successively,
  120 parts by weight of a commercial, about 40% strength copolymer dispersion based on polyacrylate,
  15 parts by weight of a mixed resin based on melamine-urea-formaldehyde,
  25 parts by weight of the 37% strength aqueous dispersion of the pigment with the C.I. No. 74 160 and
  10 parts by weight of the 33.3% strength aqueous solution of an inorganic compound which splits off acid.
Finally,
  150 parts by weight of white spirit of the boiling range 180°-230° C. are emulsified in.
After drying, fixation is effected through heating to 180° C. for 2 minutes.

The bright blue print is distinguished by good levelness and good fastness properties; in particular, the handle is better than in the case of conventionally produced prints.

We claim:

1. The process for the preparation of a crosslinked copolymer composition comprising
   (a) polymerizing in the presence of a radical initiator in a water-miscible alkanol solution k mole percent acrylamide with 0 to 45 mole percent of a compound of the formula

and 0.1 to 20 mole percent of a crosslinking agent wherein k is 99.9 to 50, $R^2$ and $R^3$ are hydrogen or methyl with the proviso that only one of $R^2$ and $R^3$ may be simultaneously methyl, and X is a member selected from the group consisting of cyano, carboxyl, alkoxy carbonyl having a total of 1 to 9 carbon atoms, alkoxy carbonyl with hydroxy substituted alkoxy moiety having 2 to 8 carbon atoms in the hydroxy substituted alkoxy; alkanoyloxy having a total of 2 to 6 carbon atoms, alkanoylamino having a total of 2 to 8 carbon atoms, cyclic alkanoylamino having a total of 4 to 8 carbon atoms, phenyl and trialkoxysilyl having 1 to 2 carbon atoms in the alkoxy;
   (b) subjecting the polymer paste from (a) to strong shearing forces until a uniform flow behavior of the suspension is achieved; and
   (c) mixing the suspension from (b) with the action of strong shearing forces with p mole percent of a hydroxide of the formula MOH wherein p is 5 to k and M is an alkali metal; and
   (d) saponifying the polymer mixture from (c) at 30° to 150° C. until p mole percent of amide moieties are saponified to —COOM;
   (e) removing by-product ammonia;
   whereby the resulting polymer has the composition of k-p mole percent of

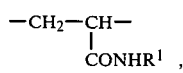

p mole percent

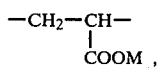

0 to 45 mole percent

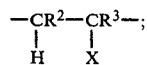

and 0.1 to 20 mole percent of said crosslinking agent; wherein $R^1$ is in the statistical mean, 0 to 100% hydrogen and 100 to 0% —CH$_2$OH— and k, p, $R^2$, $R^3$, x and M have the aforesaid meaning.

2. The process according to claim 1 wherein $R^2$ is hydrogen, $R^3$ is hydrogen or methyl and X is a member selected from the group consisting of cyano, carboxyl, alkoxycarbonyl having a total of 1 to 9 carbon atoms, alkoxycarbonyl with hydroxy substituted alkoxy moiety having 2 to 8 carbon atoms in the hydroxy substituted alkoxy; acetoxy, N-pyrrolidonyl, phenyl and triethoxysilyl.

3. The process according to claim 1 wherein the crosslinking agent is

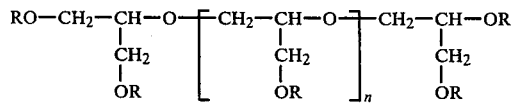

wherein n is a number from 0 to 30, and

R is 70 to 5% hydrogen and 95 to 30% —CH$_2$—CH=CH$_2$ or —CH$_2$—C(CH$_3$)=CH$_2$.

4. The process according to claim 3 wherein 0 to 20 mole percent of the compound of the formula

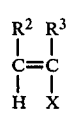

is incorporated by polymerization.

5. The process according to claim 3 wherein no compound of the formula

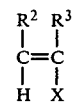

is used for the polymerization.

6. The process according to claim 1 wherein 1 to 2 mole percent of the crosslinking agent are incorporated by polymerization.

7. The process according to claim 1 wherein in step (c) the suspension from (b) is mixed with 30 to 70 mole % of an alkali metal hydroxide of the formula MOH and heated to saponify 30 to 70 mole % amide groups to —COOM.

8. The process for preparation of a crosslinked copolymer composition comprising (a) polymerizing in the presence of a radical initiator in a water-miscible alkanol solution k mole percent acrylamide and 0.1 to 20 mole percent of a crosslinking agent of the formula

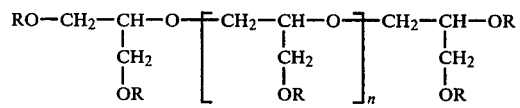

wherein n is a number from 0 to 30, and

R is 70 to 5% hydrogen and 95 to 30% —CH$_2$—CH=CH$_2$ or —CH$_2$—C(CH$_3$)=CH k is 99.9 to 50, (b) subjecting the polymer paste from (a) to strong shearing forces until a uniform flow behavior of the suspension is achieved; and (c) mixing the suspension from (b) with the action of strong shearing forces with p mole percent of a powdered hydroxide of the formula MOH wherein p is 5 to k and M is an alkali metal; and (d) saponifying the polymer mixture from (c) at 30° to 150° C. until p mole percent of amide moieties are saponified to —COOM;

(e) removing by-product ammonia;

whereby the resulting polymer has the composition of k-p mole percent of

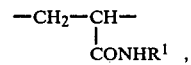

p mole percent

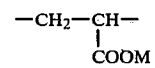

and 0.1 to 20 mole percent of said crosslinking agent; wherein $R_1$ is hydrogen and k, p and M have the aforesaid meaning.

* * * * *